United States Patent
Watanabe (10) Patent No.: US 7,541,765 B2
(45) Date of Patent: Jun. 2, 2009

(54) MOTOR CONTROLLING CIRCUIT AND METHOD

(75) Inventor: Shinpei Watanabe, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 226 days.

(21) Appl. No.: 11/598,739

(22) Filed: Nov. 14, 2006

(65) Prior Publication Data
US 2007/0122125 A1 May 31, 2007

(30) Foreign Application Priority Data
Nov. 30, 2005 (JP) .............................. 2005-345136

(51) Int. Cl.
*G05B 19/18* (2006.01)
(52) U.S. Cl. .................. 318/569; 318/799; 318/491; 388/803
(58) Field of Classification Search .................. 388/803, 388/812, 912; 318/569, 799, 490, 491, 798, 318/807
See application file for complete search history.

(56) References Cited

U.S. PATENT DOCUMENTS 4,211,967 A * 7/1980 Akiyama et al. ............. 318/490
4,684,262 A * 8/1987 Meister ....................... 368/157

FOREIGN PATENT DOCUMENTS

JP 2004-054762 2/2004

\* cited by examiner

*Primary Examiner*—Karen Masih
(74) *Attorney, Agent, or Firm*—McGinn IP Law Group, PLLC (57) ABSTRACT

A motor control circuit includes: a detector outputting a detection signal in accordance with the motor rpm; a counter counting the number of clocks in accordance with a rotational cycle represented by the detection signal; a controller counting a DC motor based on the count value; and a divider dividing a frequency of a basic clock based on a preset division value to generate a counting clock. The divider generates a counting clock having a frequency corresponding to a rotational cycle, and the counter counts the number of counting clocks.

17 Claims, 6 Drawing Sheets

MOTOR CONTROLLING CIRCUIT AND METHOD

BACKGROUND OF THE INVENTION

1. Field of the Invention

The present invention relates to a motor control circuit and method controlling the rpm of a motor based on digital feedback control.

2. Description of Related Art

Figure 3:
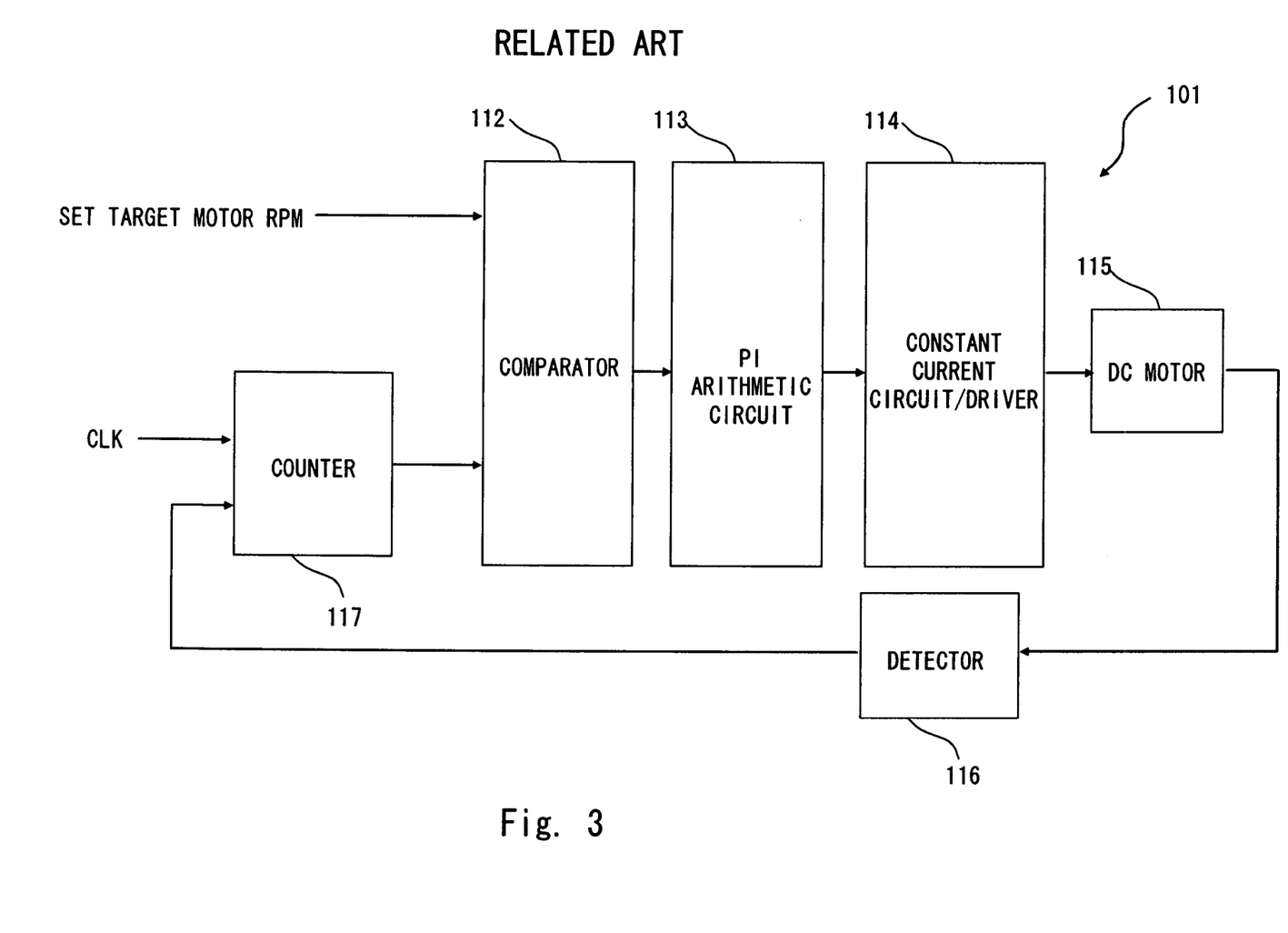
FIG. 3 shows a general digital feedback control circuit.

As a method of keeping the motor rpm constant, feedback control has been generally used. FIG. 3 is a block diagram of a typical digital feedback control circuit. As shown in FIG. 3, a conventional, typical feedback control circuit 101 includes a comparator 112, a PI (proportional plus integral) arithmetic circuit 113, a constant current circuit/driver 114, a DC motor 115, a detector 116, and a counter 117.

In the digital feedback control circuit 101, the rotation of the DC motor 115 is limited by a current value of the constant current circuit/driver 114, and the detector 116 detects a rotational cycle (period) of the DC motor 115. The counter 117 counts the number of clocks CLK while the detector 116 detects the cycle. Then, the counter sends a count value to the comparator 112. The comparator 112 compares a current speed (motor rpm) sent from the counter 117 with an externally-supplied preset target speed to execute control such that the current speed approximates to the target speed. That is, the arithmetic circuit 113 calculates such a current value as to attain a target speed, and a current value of the constant current circuit/driver 114 is adjusted to drive a motor.

According to such digital feedback control, speed and cycle information are controlled as digital values. Regarding analog feedback control, a resistance or capacitance value should be adjusted in accordance with a load for stable control. In contrast, the digital feedback control has an advantage in that a constant is input as digital data and thus the adjustment is facilitated.

Incidentally, in the feedback circuit, if a target motor rpm is variable, the following problem arises. That is, although a rotational cycle is variable, a counting cycle of the clock CLK is fixed, so an accuracy of adjustment toward the target speed fluctuates. For example, if a counting cycle of clocks to be counted is reduced (frequency is increased) in step with a high rotational speed, a count value increases in the case of driving the motor at low rotational speed. Thus, it is necessary to increase a bit rate of the counter 117. Meanwhile, if a counting cycle of clocks CLK is increased (frequency is decreased) in step with a low rotational speed, a control accuracy upon counting a speed is insufficient in the case of driving the motor at high rotational speed.

Figure 4:
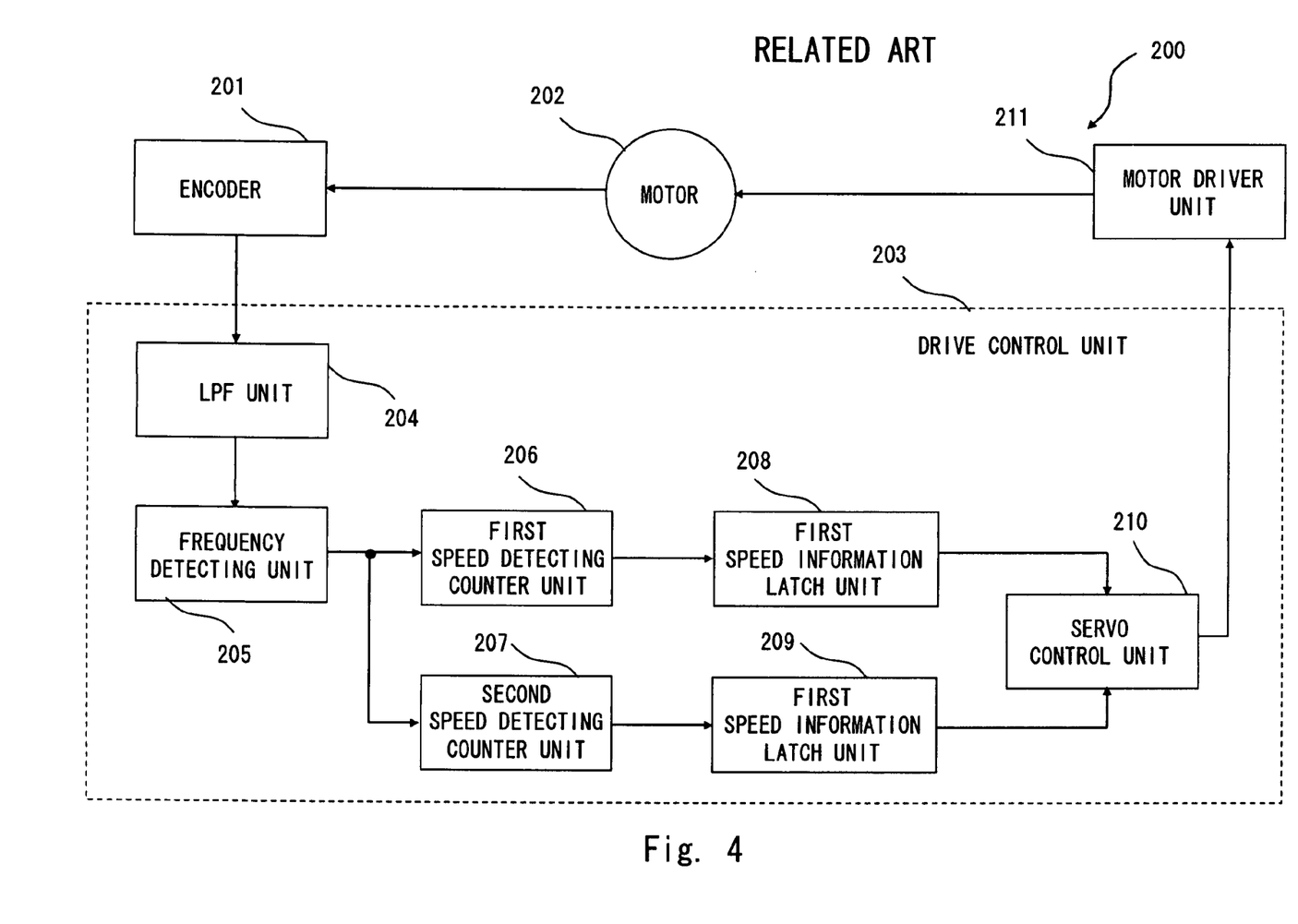
FIG. 4 shows a motor control circuit disclosed by Shoji et al.

Meanwhile, Japanese Unexamined Patent Application Publication No. 2004-54762 (Shoji et al.) discloses a motor controlling apparatus provided with plural counter units and latch units. FIG. 4 is a block diagram of the motor controlling apparatus disclosed by Shoji et al. As shown in FIG. 4, a motor controlling apparatus 200 disclosed by Shoji et al. includes a digital encoder 201, a drive control unit 203, and a motor driver unit 211, and controls driving of a motor 202. The digital encoder 201 outputs a signal of a rectangular waveform each time a mechanism is moved (rotated) by a predetermined distance (angle) as a result of driving the motor 202. The drive control unit 203 includes an LPF (low-pass filter) unit 204, a frequency detecting unit 205, a first speed detecting counter unit 206, a second speed detecting counter unit 207, a first speed information latch unit 208, a second speed information latch unit 209, and a servo control unit 210.

Noise components of an output signal from the digital encoder 201 are removed through the LPF unit 204 of the drive control unit 203, and the resultant signal is input to the frequency detecting unit (edge detecting unit) 205. The frequency detecting unit 205 generates a frequency detection signal based on the output signal of the digital encoder 201 to send the generated signal to the first speed detecting counter unit 206 and the second speed detecting counter unit 207. The two counter units 206 and 207 measure a cycle of the output signal of the digital encoder by counting the number of input clocks. Here, the two counter units differ in terms of a unit encoder cycle. For example, the first speed detecting counter unit 206 counts clocks on the basis of one encoder cycle, and the second speed detecting counter unit 207 counts clocks on the basis of two encoder cycles.

Here, there is an asynchronous relation between an output signal of the digital encoder 201, and the LPF unit 204 and the counter units 206 and 207. As a result, quantization error inevitably occurs. In the case of driving the motor 202 at low rotational speed, a cycle of the output signal of the encoder 201 is long, so an influence of the quantization error is small. However, as the rotational speed increases, the influence of the quantization error becomes larger. As a measure for minimizing the influence of the quantization error upon high-speed rotation, there is a method of increasing a count frequency. However, in this case, the count value increases upon low-speed rotation, so a counter of a high bit rate should be used.

To that end, the counter unit is composed of the two counter units 206 and 207 and the latch units 208 and 209 to overcome the above problem. For example, a reference count value is set to 5 with respect to the target rpm. Even if the motor is actually driven at a speed closer to that speed, a detected count value varies from 4 to 6 (quantization error occurs) in some cases. If one counter is provided, variations of the output count value are not changed (reduced). If two counters are provided, variations of the count value with respect to two encoder cycles are about ½ of variations of the count value with respect to one encoder cycle. Therefore, variations of the count value, that is, quantization error can be suppressed. As described above, in the technique disclosed by Shoji et al., the number of clocks input during plural consecutive cycles is counted to reduce the quantization error.

In the technique disclosed by Shoji et al., plural counter units and latch units are provided, and an influence of the quantization error can be minimized thereby. However, a counting cycle for measuring the motor rpm is fixed, which results in a problem that an accuracy of adjustment toward the target speed is changed between low-speed rotation and high-speed rotation, similar to the aforementioned related art. In other words, if a clock cycle to be counted is reduced in step with a high rotational speed, the count value increases in the case of driving the motor at low speed, so a bit rate of the counter should be increased. Further, there arises another problem in that, if a clock cycle is increased in step with a low rotational speed, a control accuracy is insufficient in the case of driving the motor at high rotational speed.

The above problems are described in detail next. FIGS. 5A, 5B, 6A, and 6B show rotational cycles (cycle of a detection signal D) and clocks CLK upon high-speed rotation and low-speed rotation. For example, if the target rpm of the DC motor is set variable from 10 Hz to 1 kHz, a counter needs to count a cycle longer than 100 ms and count a cycle shorter than 1 ms with sufficient speed detection resolution.

Figure 5A:
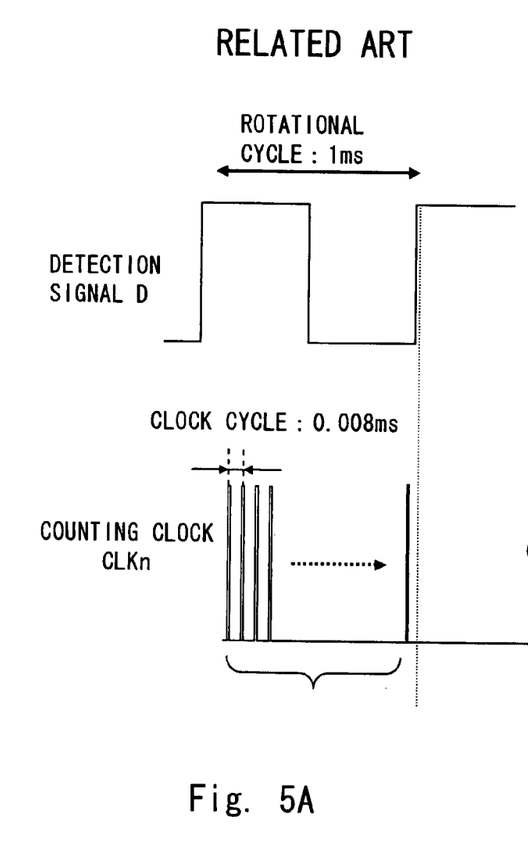
FIG. 5A shows a rotational cycle and a clock cycle in the case where a clock cycle is short and a rotational speed is high.
Figure 5B:
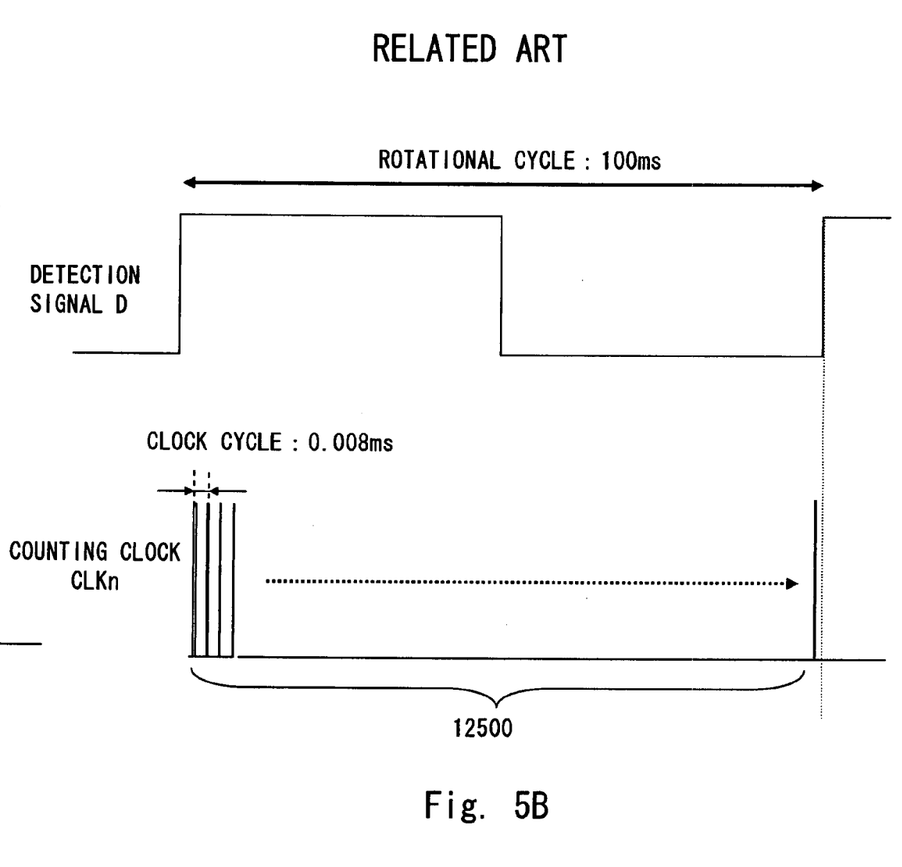
FIG. 5B shows a rotational cycle and a clock cycle in the case where a clock cycle is short and a rotational speed is low.

It is assumed that when the rotational speed is high, the cycle is set to, for example, 1 kHz, a bit rate of the counter is 8, and a target speed is about half the maximum count value, that is, 125. In this case, a cycle of the clock CLK is as follows: 1 ms/125=0.008 ms (FIG. 5A). Assuming that a rotational speed is low (10 Hz) with the cycle of the clock CLK, a required bit rate of a counter is about 15 bits (100 ms/0.008 ms=12500) (FIG. 5B). Other circuits should be accordingly configured to set a bit rate with reference to 15 bits (count value), with the result that the circuit scale is increased.

Figure 6A:
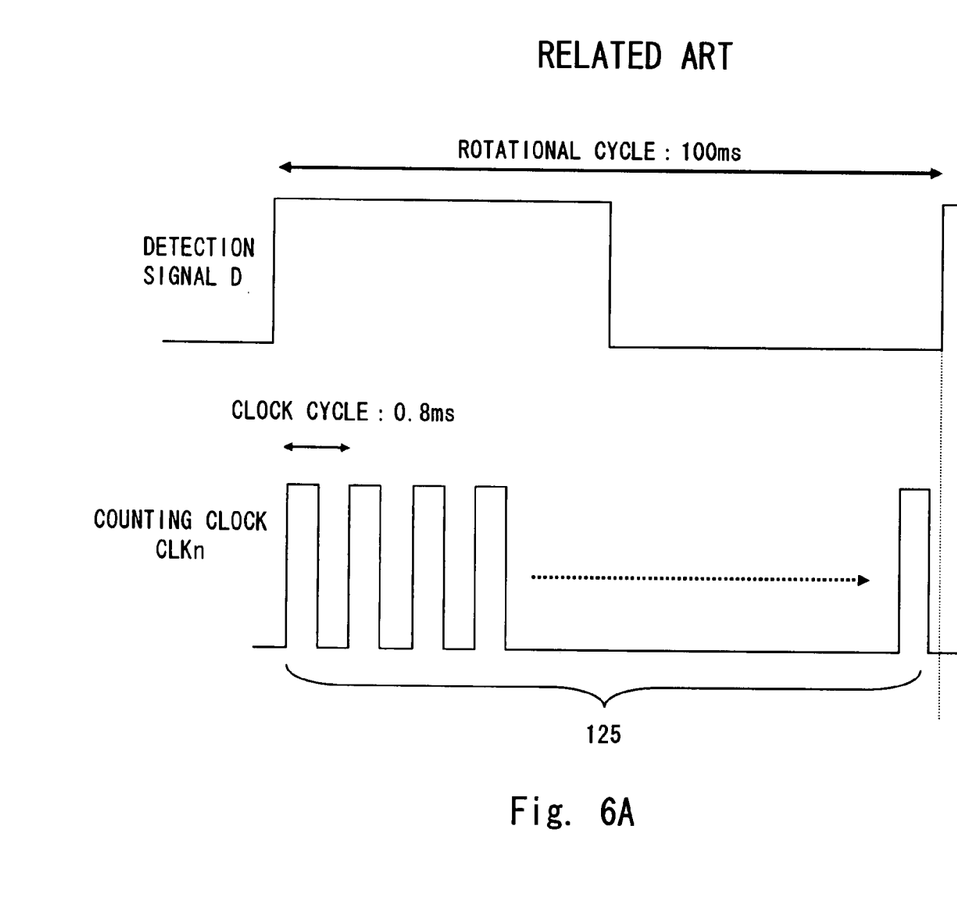
FIG. 6A shows a rotational cycle and a clock cycle in the case where a clock cycle is long and a rotational speed is high.
Figure 6B:
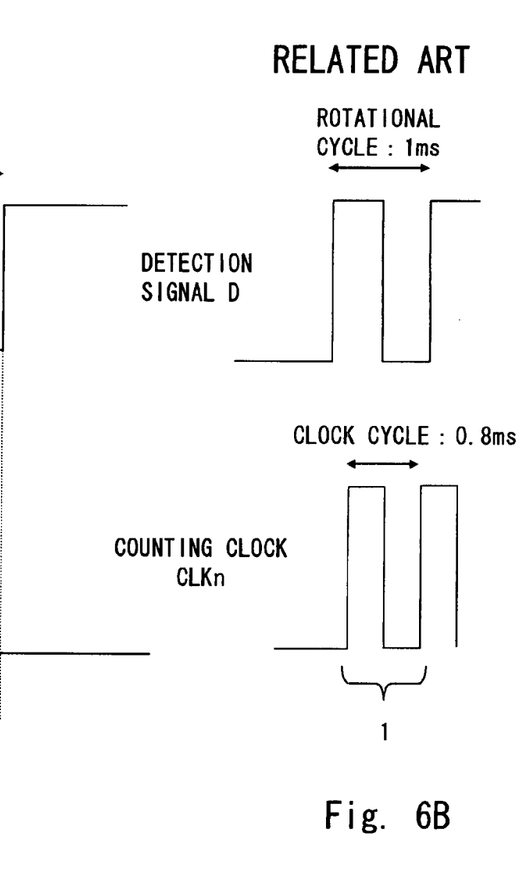
FIG. 6B shows a rotational cycle and a clock cycle in the case where a clock cycle is long and a rotational speed is low.

Similarly, considering that a rotational speed is low, for example, 10 Hz, the counting cycle is 100 ms/125=0.8 ms (FIG. 6A). This value is substantially equivalent to 1 bit of the above case where the rotational speed is high (1 kHz=1 ms) (FIG. 6B) The feedback control cannot be executed with sufficient accuracy at this bit rate.

SUMMARY OF THE INVENTION

An aspect of the present invention relates to a motor control circuit controlling motor driving through digital feedback control, wherein a counting cycle of counting a speed of movement due to the motor driving is set variable in accordance with the speed of movement.

Another aspect of the invention relates to a motor controlling method of controlling motor driving through digital feedback control, includes: driving a moving cycle in accordance with a speed of movement due to the motor driving; generating a counting clock having a cycle in accordance with the moving cycle; counting the counting clock; and controlling the motor based on the count value.

According to the present invention, a counting cycle of counting measuring a speed of movement due to the motor driving is set variable in accordance with the speed of movement, whereby an accuracy of adjustment toward a target speed can be almost the same between low-speed rotation and high-speed rotation.

That is, according to the present invention, it is possible to provide a motor control circuit and method that can keep a control accuracy without increasing a bit rate of the counter even if a target movement speed is different.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

Figure 1:
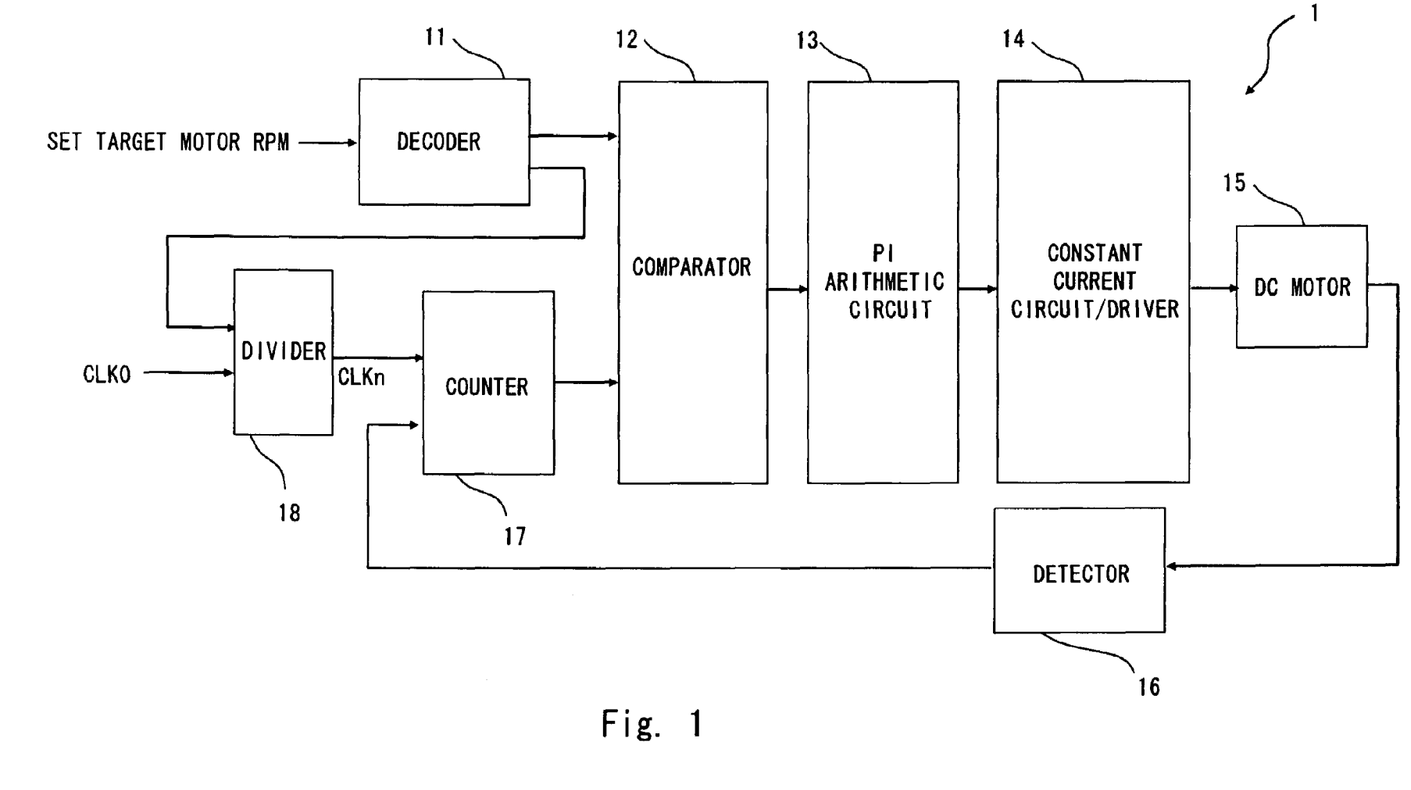
FIG. 1 is a block diagram showing a motor control circuit according to an embodiment of the present invention.

Hereinafter, an embodiment of the present invention is described in detail with reference to the accompanying drawings. FIG. 1 shows a motor control circuit according to the embodiment of the present invention. A motor control circuit 1 of this embodiment includes a divider 18 and a decoder 11 in addition to components of a conventional motor control circuit of FIG. 3, which executes digital feedback control to keep the motor rpm constant. That is, as shown in FIG. 1, the motor control circuit 1 of this embodiment includes the decoder 11, a comparator 12, a PI arithmetic circuit 13, a constant current circuit (driver) 14, a DC motor 15, a detector 16, a counter 17, and the divider 18.

The decoder 11 divides a frequency in accordance with the target rpm of DC motor 15. The comparator 12 compares a preset value with a count value of the counter 17 and supplies the comparison result to the PI arithmetic circuit 13. The PI arithmetic circuit 13 and the constant current circuit/driver 14 function as controllers controlling the motor based on a count result. The PI arithmetic circuit 13 calculates a value of current generated with the constant current circuit/driver 14 based on the comparison result. Further, the constant current circuit/driver 14 generates a constant current based on the calculation result of the PI arithmetic circuit 13.

The DC motor 15 is rotated in accordance with the value of current generated by the constant current circuit/driver 14. The detector 16 outputs a detection signal in accordance with how far a device is moved. To be specific, the rotation of the DC motor 15 is detected, and a detection signal D representing the rotational cycle is sent to the counter 17.

The divider 18 divides a basic clock CLK0 based on a division value from the decoder 11 to generate a counting clock (divided clock) CLKn and supply the clock to the counter 17. Incidentally, in this embodiment, the division value is set by the decoder 11 but may be directly and externally set in a divider 18. The counter 17 receives the detection signal D from the detector 16, and outputs a count value in accordance with the length of the cycle (rotational period). For example, the counter 17 counts the number of counting clocks CLKn supplied from the divider 18 during the rotational cycle, and supplies a count value to the comparator 12.

Next, a motor controlling method of this embodiment is described. First, the detector 16 outputs the detection signal D in accordance with the rpm of the DC motor 15. At this time, the decoder 11 generates a division value based on the target rpm to supply the generated value to the divider 18. The divider 18 divides the basic clock CLK0 based on the division value set by the decoder 11 to generate the counting clock CLKn. Then, the counting clock is supplied to the counter 17.

The counter 17 counts the number of counting clocks CLKn in the rotational cycle represented by the above detection signal D. Then, the count value is supplied to the comparator 12. The comparator 12 receives the count value of the target rpm (target count value) through the decoder 11, and compares an actual count value from the counter 17 with the target count value. The PI arithmetic circuit 13 calculates a value of current generated by the constant current circuit/driver 14 based on the comparison result.

To be specific, an amount of current is increased based on the comparison result if the target count value<the actual count value, that is, if a current rotational speed of the DC motor 15 is lower than the target rpm. Alternatively, an amount of current is decreased based on the comparison result if the target count value>the actual count value, that is, if a current rotational speed of the DC motor 15 is higher than the target rpm. The constant current circuit/driver 14 generates a driving current for driving the DC motor 15 based on the preset value of the PI arithmetic circuit 13.

In this embodiment, the decoder 11 generates a division value, and sends the generated division value to the divider 18. Then, the divider divides the clock CLK0 to be counted by the counter 17 in accordance with the division value. As a result, the target speed is made variable. Even in the case where the rotational cycle is different, the counting cycle of the counting clock is variable. Thus, it is unnecessary to increase a bit rate of the counter, and it is possible to count the number of clocks necessary for the rotational cycle. That is, it is possible to prevent a control accuracy from lowering without increasing a circuit area of the counter 17, the comparator 12, and the PI arithmetic circuit 13.

Next, detailed description is given of operations of the motor control circuit of this embodiment based on actual numerical values. This embodiment describes an example where the DC motor 15 is designed to set the target rpm variable from 10 Hz to 1 kHz. In this case, the counter needs to count a cycle longer than 100 ms and count a cycle shorter than 1 ms with sufficient speed detection resolution.

Figure 2A:
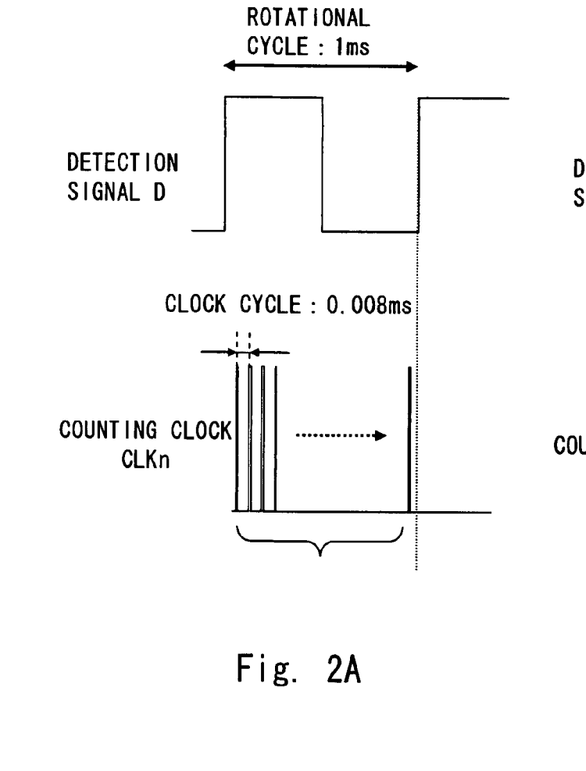
FIG. 2A is an explanatory view of a rotational cycle and a clock cycle (rotational frequency and clock frequency) in the motor control circuit according to the embodiment of the present invention, or a schematic diagram of a counting cycle and a rotational cycle in the case where a target speed is low.
Figure 2B:
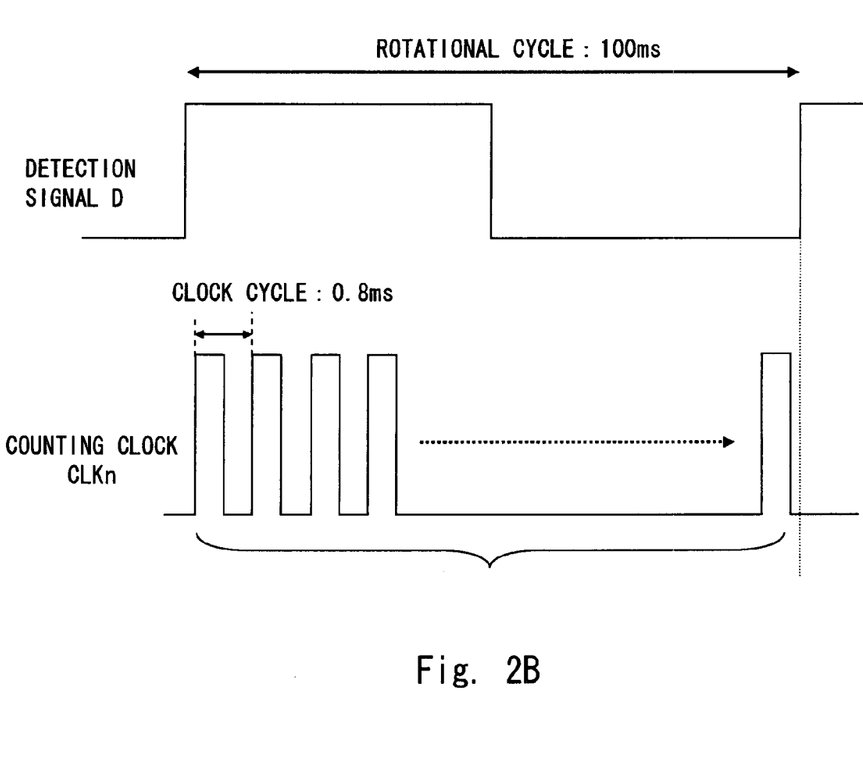
FIG. 2B is an explanatory view of a rotational cycle and a clock cycle (rotational frequency and clock frequency) in the motor control circuit according to the embodiment of the present invention, or a schematic diagram of a counting cycle and a rotational cycle in the case where a target speed is high.

FIGS. 2A and 2B are schematic diagrams of a counting cycle and a rotational cycle in the case where the target speed is low and high, respectively. Description is made of the example where the target speed is set variable from 10 Hz to 1 kHz. FIG. 2B shows the case where the target speed is low, that is, 100 ms. That is, the clocks (division value generated with the decoder 11) are counted with the counting cycle of the counting clock CLKn set to, for example, 0.8 ms. FIG. 2A shows the case where the target rotational speed is high, that is, 1 ms. That is, for example, the clocks are counted with the counting cycle of the counting clock CLKn set to 0.008 ms. As described above, the division value generated with the decoder 11 is set, and the divider 18 divides the clock CLK0. Thus, a target bit rate (control accuracy) after decoding is about 8 bits (7 Dh=125).

Incidentally, the above description is directed to such a division value that the bit rate of the counter is about 8 bits. In practice, it is necessary to preset the division value in consideration of the bit rate of the counter and the control accuracy.

In this embodiment, a conventional problem that the control accuracy lowers at the time of high-speed rotation can be overcome by adding the decoder 11 and the divider 18. That is, the decoder 11 generates the division value in accordance with the target rpm, and the divider 18 divides a frequency of clocks to be counted by the counter 17. At this time, a division value that makes the control accuracy (bit rate) constant between the low-speed rotation and the high-speed rotation is previously set in the decoder, making it possible to execute feedback control upon high-speed rotation without lowering the control accuracy.

In this way, in this embodiment, at the time of controlling the rpm of the motor through the digital feedback control, even if the rpm is set variable, an accuracy of adjustment toward the target speed is not changed. Further, the above can be realized only by counting the rotational cycle based on the counting clock CLKn having a frequency corresponding to the rotational speed, and in this embodiment, by adding the decoder 11 and the divider 18 for generating the counting clock CLKn. Therefore, it is unnecessary to reduce an influence of a quantization error by adding plural counter circuits to downsize a circuit.

Further, even in the case of determining a frequency of the counting clock CLKn supplied to the counter 17 with a control accuracy necessary for high-speed rotation, a frequency of the counting clock CLKn supplied to the counter 17 can be lowered upon the low-speed rotation. Thus, it is possible to suppress an increase in area of the PI arithmetic circuit 13 or other such circuits. As a result, the entire circuit scale can be considerably reduced.

For example, in this embodiment, the decoder 11 and the divider 18 are provided to generate the counting clock CLKn, but the present invention is not limited thereto. That is, any circuit configuration can be adopted as long as the rotational cycle can be counted based on the counting clock CLKn having a frequency variable in accordance with the motor rpm. Further, the clock cycle of the counting clock is set variable in accordance with the rotational cycle. The clock cycle of the counting clock may be set variable in accordance with the moving speed of the mechanism driven by the motor.

It is apparent that the present invention is not limited to the above embodiment that may be modified and changed without departing from the scope and spirit of the invention.

What is claimed is:

1. A motor control circuit controlling motor driving through digital feedback control, said motor control circuit comprising:
    a detector detecting a speed of a motor;
    a counter counting a counting clock based on a detecting result of the detector; and
    a digital feedback controller controlling a speed of the motor based on a target speed of the motor and a count value of said counter,
    wherein said digital feedback controller sets a frequency of said counting clock variably in accord with the target speed of the motor.

2. The motor control circuit controlling motor driving through digital feedback control according to claim 1, further comprising:
    a divider dividing a basic clock by a division value to generate the counting clock,
    wherein the digital feedback controller sets the division value according to the target speed of the motor.

3. The motor control circuit according to claim 2, further comprising a decoder, wherein
    said decoder accepts a target value representing said target speed of the motor as an input, and
    said decoder produces said division value as an output.

4. The motor control circuit according to claim 2, wherein the digital feedback controller comprises:
    a comparator comparing the count value of the counter with a target value;
    an arithmetic unit calculating a driving current of the motor based on a comparison result of the comparator; and
    a driver unit driving the motor based on a calculation result of the arithmetic unit.

5. The motor control circuit according to claim 3, wherein the digital feedback controller comprises
    a comparator comparing the count value of the counter with a target value;

an arithmetic unit calculating a driving current of the motor based on a comparison result of the comparator; and a driver unit driving the motor based on a calculation result of the arithmetic unit.

6. The motor control circuit according to claim 1, wherein said count value comprises a number of cycles of a counting clock.

7. The motor control circuit according to claim 1, wherein said controller accepts as an input a target value corresponding to a desired speed of the motor.

8. The motor control circuit according to claim 7, wherein said target value differs from said desired speed of the motor.

9. The motor control circuit according to claim 3, wherein said division value differs from said target value.

10. The motor control circuit according to claim 1, wherein said counting clock is selected from a plurality of counting clocks.

11. The motor control circuit according to claim 9,
wherein a relationship between said target value and said counting cycle is nonlinear, and
wherein a relationship between said target value and said division value is nonlinear.

12. The motor control circuit according to claim 11, wherein a variation of said target value is much greater than a variation of said counting cycle.

13. The motor control circuit according to claim 3, wherein said decoder further produces said counting cycle based on said counting clock frequency and said desired speed of the motor.

14. A motor controlling method of controlling motor driving using digital feedback control, said method comprising:

setting a frequency of a counting clock according to a target speed of a motor;

setting a counting cycle based at least on the frequency of the counting clock;

detecting a speed of the motor;

counting the counting clock during the counting cycle, said counting being based on said detected speed of the motor; and controlling the motor based on the counting.

15. The motor controlling method according to claim 14, wherein the generating of the counting clock includes setting a division value based on a target value corresponding to the target speed of the motor to divide a frequency of a basic clock.

16. The motor controlling method according to claim 14, wherein the controlling of the motor driving includes:

comparing the count value of the counter with the counting cycle;

calculating a driving current of the motor based on the comparison result; and driving the motor based on the calculation result.

17. The motor controlling method according to claim 15, wherein the controlling of the motor driving includes:

comparing the count value of the counter with the counting cycle;

calculating a driving current of the motor based on the comparison result; and driving the motor based on the calculation result.

* * * * *